US012753043B2

(12) United States Patent
Sato

(10) Patent No.: US 12,753,043 B2
(45) Date of Patent: Oct. 6, 2026

(54) ELEVATING BODY DERAILMENT DETECTION DEVICE

(71) Applicant: Mitsubishi Electric Corporation, Tokyo (JP)

(72) Inventor: Shinichi Sato, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 850 days.

(21) Appl. No.: 17/990,767

(22) Filed: Nov. 21, 2022

(65) Prior Publication Data

US 2024/0002191 A1 Jan. 4, 2024

(30) Foreign Application Priority Data

Jun. 29, 2022 (JP) ................................ 2022-104344

(51) Int. Cl.
*B66B 5/00* (2006.01)
*G01V 8/20* (2006.01)

(52) U.S. Cl.
CPC .............. *B66B 5/0031* (2013.01); *G01V 8/20* (2013.01)

(58) Field of Classification Search
CPC ................................ G01V 8/20; B66B 5/0031
USPC ......................................................... 187/393
See application file for complete search history.

(56) References Cited

FOREIGN PATENT DOCUMENTS

| | | | |
|---|---|---|---|
| JP | 10-182027 | A | 7/1998 |
| JP | 2004-091135 | A | 3/2004 |
| JP | 2008-30933 | A | 2/2008 |
| JP | 2009-51604 | A | 3/2009 |

OTHER PUBLICATIONS

Matsuzawa et al. (JP 2009051604 A), Derailment Detector of Elevator (Year: 2009).*
Nakagawa (JP 2020063127 A), Long Object Hooking Detection Device (Year: 2020).*
Hiroki Nozue et al. (JP 2004091135 A) Elevator Derailment Detection Apparatus (Year: 2004).*
Kobayashi et al. (JP H1179588 A) Balance Weight Derailment Detection Device for Elevator (Year: 1999).*
Office Action issued Aug. 5, 2025 in Japanese Patent Application No. 2022-104344, 5 pages.

* cited by examiner

*Primary Examiner* — Jorge L Carrasquillo
(74) *Attorney, Agent, or Firm* — XSENSUS LLP

(57) ABSTRACT

An elevating body derailment detection device includes: a photoelectric sensor provided on an elevating body elevated and lowered along a guide rail, including a light emitter which performs irradiation of light and a photodetector which receives the light, and attached to a position where the photodetector is blocked from receiving the light by the guide rail or a wire provided in parallel with an elevating and lowering direction of the elevating body; and a detector configured to detect that the elevating body is detached from the guide rail. The photodetector receives the light in response to the photoelectric sensor moving from the position. The detector detects that the elevating body is detached from the guide rail when the photodetector receives the light.

3 Claims, 16 Drawing Sheets

Fig. 5

| | PHOTO-DETECTOR 12a | PHOTO-DETECTOR 12b | PHOTO-DETECTOR 12c |
|---|---|---|---|
| FIRST RECEPTION PATTERN | ON | OFF | ON |
| SECOND RECEPTION PATTERN | OFF | ON | ON |
| THIRD RECEPTION PATTERN | ON | ON | OFF |
| FOURTH RECEPTION PATTERN | ON | ON | ON |
| FIFTH RECEPTION PATTERN | OFF | OFF | ON |
| SIXTH RECEPTION PATTERN | ON | OFF | OFF |

Fig. 13

| | PHOTO-DETECTOR 12a | PHOTO-DETECTOR 12b | PHOTO-DETECTOR 12c |
|---|---|---|---|
| SEVENTH RECEPTION PATTERN | OFF | OFF | ON |
| EIGHTH RECEPTION PATTERN | ON | ON | ON |
| NINTH RECEPTION PATTERN | ON | OFF | ON |

ELEVATING BODY DERAILMENT DETECTION DEVICE

CROSS-REFERENCE TO RELATED APPLICATIONS

The present application claims priority under 35 U.S.C. § 119 to Japanese Patent Application No. 2022-104344, filed on Jun. 29, 2022, the contents of which application are incorporated herein by reference in their entirety.

TECHNICAL FIELD

The present disclosure relates to an elevating body derailment detection device.

BACKGROUND

A conventional elevating body derailment detection device includes brackets provided in a partial area of an entire length of a hoistway and a detector for detecting that an elevating body is detached from a guide rail. The two brackets are separated from each other along a vertical direction and fixed to individual guide rails. A light emitter is fixed to one bracket and a photodetector is fixed to the other bracket. The light emitter emits light toward the photodetector, and the photodetector detects existence or absence of the light. The detector detects that the elevating body is detached from the guide rail when the photodetector does not detect the light since the light emitted from the light emitter is blocked by the elevating body (for example, see JP 2009-051604 A).

For the conventional elevating body derailment detection device described above, the brackets are provided in the partial area of the entire length of the hoistway. Therefore, when the elevating body is detached from the guide rail at a part where the bracket is not provided, it cannot be detected that the elevating body is detached from the guide rail until the elevating body moves to a part where the bracket is provided, causing a problem that the detection is delayed.

SUMMARY

The present disclosure is implemented in order to solve the problem described above, and it is an object to obtain an elevating body derailment detection device capable of detecting that an elevating body is detached from a guide rail in an early stage.

The features and advantages of the present disclosure may be summarized as follows.

An elevating body derailment detection device according to the present disclosure includes: a photoelectric sensor provided on an elevating body elevated and lowered along a guide rail and including a first light emitter which performs irradiation of first light and a first photodetector which receives the first light; a wire provided in parallel with an elevating and lowering direction of the elevating body and arranged at a position to block the first photodetector from receiving the first light between the first light emitter and the first photodetector; and a detector configured to detect that the elevating body is detached from the guide rail, wherein the first photodetector receives the first light in response to the photoelectric sensor moving such that the wire deviates from the position, and the detector detects that the elevating body is detached from the guide rail when the first photodetector receives the first light.

An elevating body derailment detection device according to the present disclosure includes: a photoelectric sensor provided on an elevating body elevated and lowered along a guide rail, including a light emitter which performs irradiation of light and a photodetector which receives the light, and attached to a position where the photodetector is blocked from receiving the light by the guide rail; and a detector configured to detect that the elevating body is detached from the guide rail, wherein the photodetector receives the light in response to the photoelectric sensor moving from the position, and the detector detects that the elevating body is detached from the guide rail when the photodetector receives the light.

Other and further objects, features and advantages of the disclosure will appear more fully from the following description.

BRIEF DESCRIPTION OF DRAWINGS

FIG. 5 is a figure illustrating the reception pattern of the photodetection signals received by the detector according to the first embodiment.

FIG. 13 is a figure illustrating the reception pattern of the photodetection signals received by the detector according to the second embodiment.

DESCRIPTION OF EMBODIMENTS

First Embodiment

Hereinafter, an elevator device including an elevating body derailment detection device according to a first embodiment will be explained in details. Note that the same signs in individual drawings indicate the same or corresponding configuration.

Figure 1:
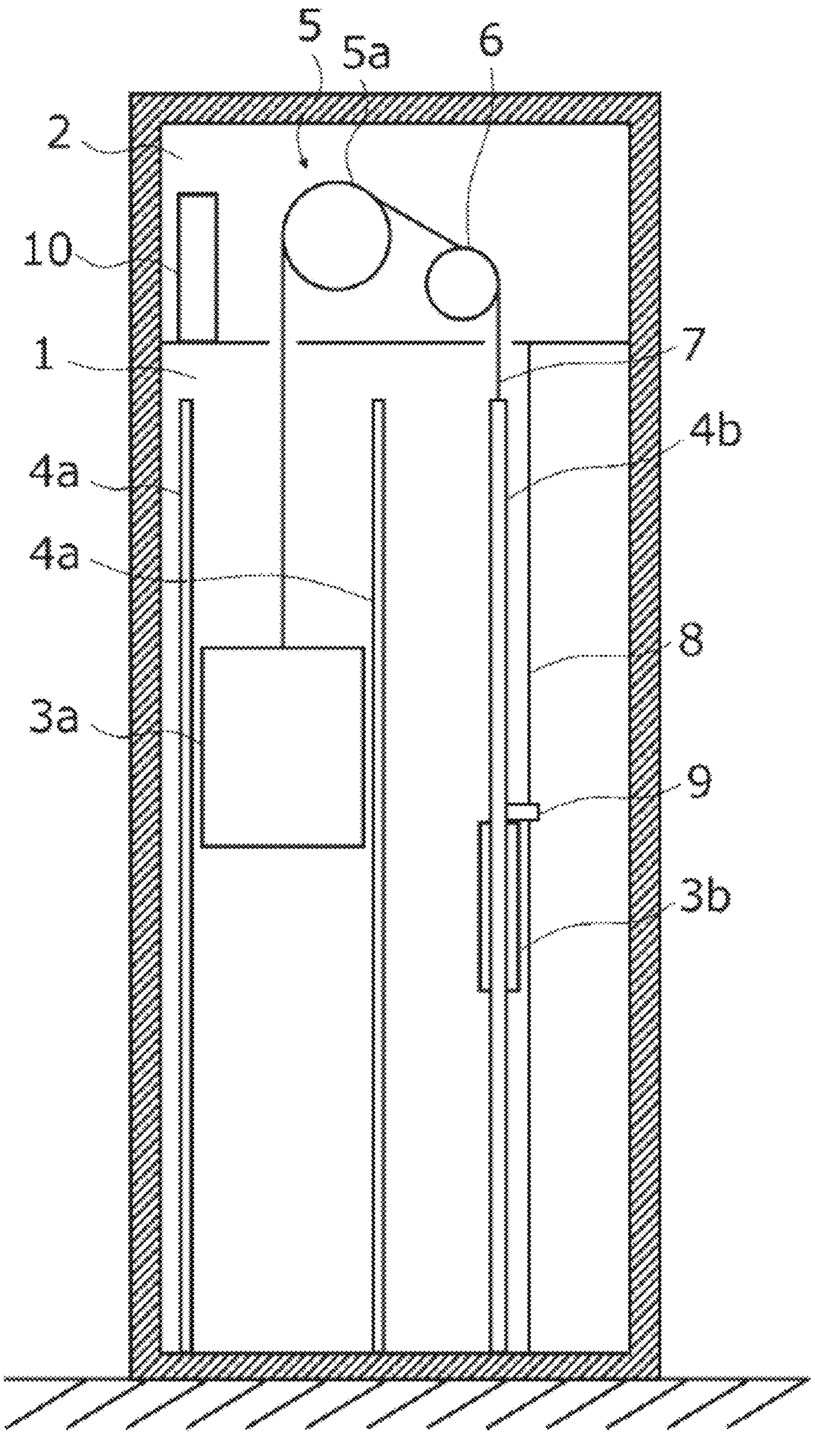
FIG. 1 is a configuration diagram of an elevator device including an elevating body derailment detection device according to a first embodiment.

As illustrated in FIG. 1, the elevator device includes elevating bodies, guide rails, a traction machine 5, a deflector sheave 6, a suspension body 7 and the elevating body derailment detection device. On an upper part of a hoistway 1, a machine room 2 is provided. Inside the hoistway 1, a car 3*a* and a counter weight 3*b* that are the elevating bodies are provided. In the following explanation, the car 3*a* and the counter weight 3*b* are called an elevating body 3 when not to be separately explained. In addition, inside the hoistway 1, car guide rails 4*a* and counter weight guide rails 4*b* that are the guide rails are provided. In the following explanation, the car guide rails 4*a* and the counter weight guide rails 4*b* are called a guide rail 4 when not to be separately explained. The car 3*a* is elevated and lowered inside the hoistway 1 along the car guide rails 4*a*. The counter weight 3*b* is elevated and lowered inside the hoistway 1 along the counter weight guide rails 4*b*.

Figure 2:
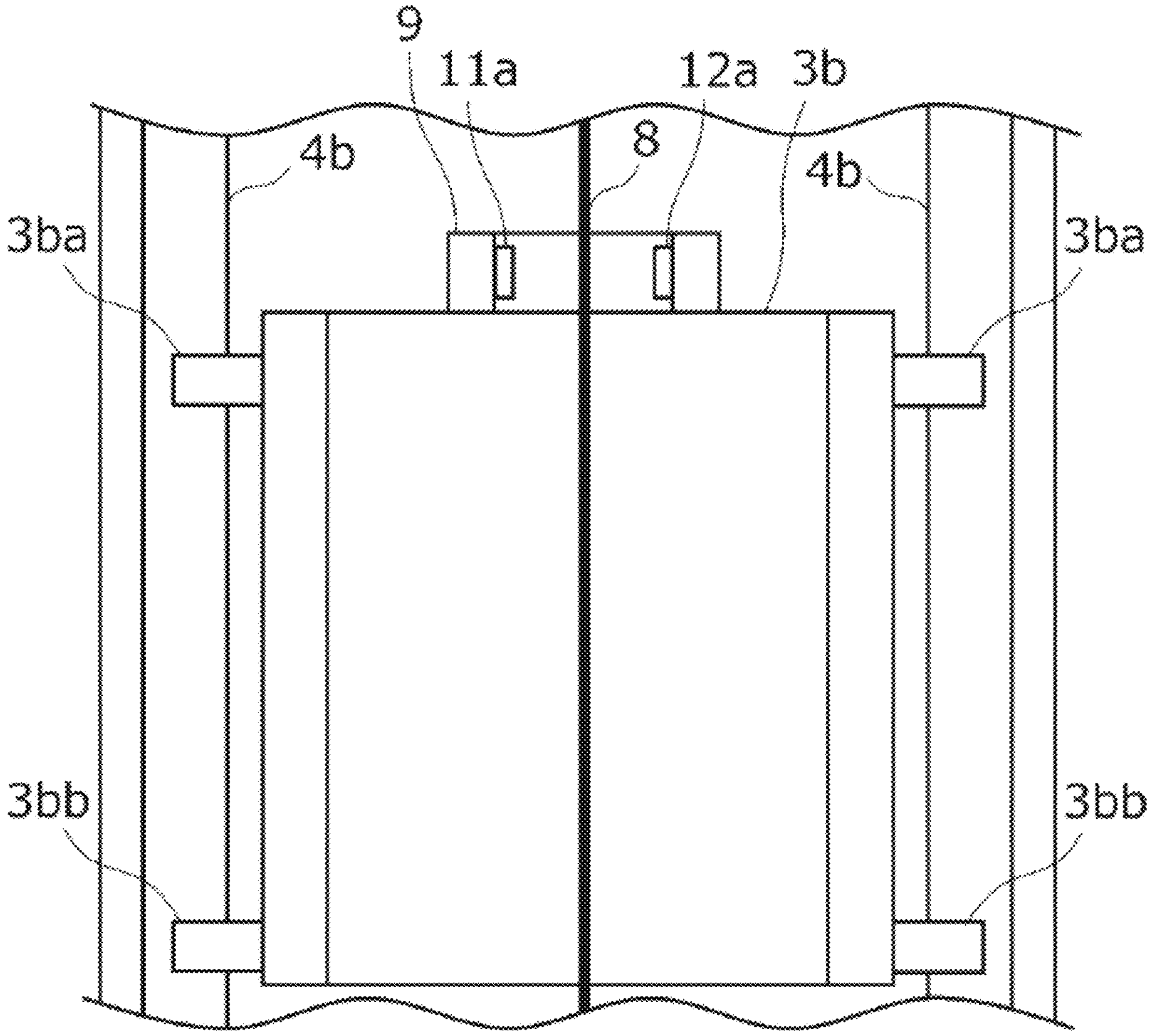
FIG. 2 is a side view of a counter weight and a photoelectric sensor according to the first embodiment.

FIG. 2 illustrates a side view of the counter weight 3*b* and a photoelectric sensor 9 to be described later. As illustrated in FIG. 2, to the counter weight 3*b*, a pair of upper guide shoes 3*ba* and a pair of lower guide shoes 3*bb* are attached. The pair of upper guide shoes 3*ba* are attached to both side parts of an upper part of the counter weight 3*b*. The pair of lower guide shoes 3*bb* are attached to both side parts of a lower part of the counter weight 3*b*. The pair of upper guide shoes 3*ba* and the pair of lower guide shoes 3*bb* slide along the counter weight guide rails 4*b* and guide elevation and lowering of the counter weight 3*b*. Note that, in FIG. 2 and FIG. 3 and FIG. 6 to FIG. 8 to be explained below, illustration of the suspension body 7 is omitted.

As illustrated in FIG. 1, in the machine room 2, the traction machine 5 and the deflector sheave 6 are provided. The traction machine 5 includes a drive sheave 5*a* and a motor (not illustrated), and the motor rotates the drive sheave 5*a*. Around the drive sheave 5*a* and the deflector sheave 6, the suspension body 7 is wound. The car 3*a* is connected to one end of the suspension body 7, and the counter weight 3*b* is connected to the other end of the suspension body 7. The elevating body 3 is elevated and lowered inside the hoistway 1 by rotation of the drive sheave 5*a*.

The elevating body derailment detection device includes a wire 8, the photoelectric sensor 9, a control device 10, a switch 14 and a notifier 15. As illustrated in FIG. 1, the wire 8 is provided inside the hoistway 1, and is arranged in parallel with an elevating and lowering direction of the elevating body 3, which is a vertical direction. In addition, when the counter weight 3*b* is not detached from the counter weight guide rails, the wire 8 is arranged at a position to block a photodetector 12*b* to be described later from receiving light B to be described later, not to block a photodetector 12*a* to be described later from receiving light A to be described later and not to block a photodetector 12*c* to be described later from receiving light C to be described later. The position is called an initial position. One end of the wire 8 is fixed to a ceiling of the hoistway 1, and the other end of the wire 8 is fixed to a floor surface of the hoistway 1.

In the following explanation, directions orthogonal to the elevating and lowering direction of the elevating body 3 are called horizontal directions. Of the horizontal directions, a direction parallel with a direction from one to the other of the counter weight guide rails 4*b* is called a depth direction. In addition, of the horizontal directions, a direction parallel with a direction orthogonal to the depth direction is called a crosswise direction.

Figure 3:
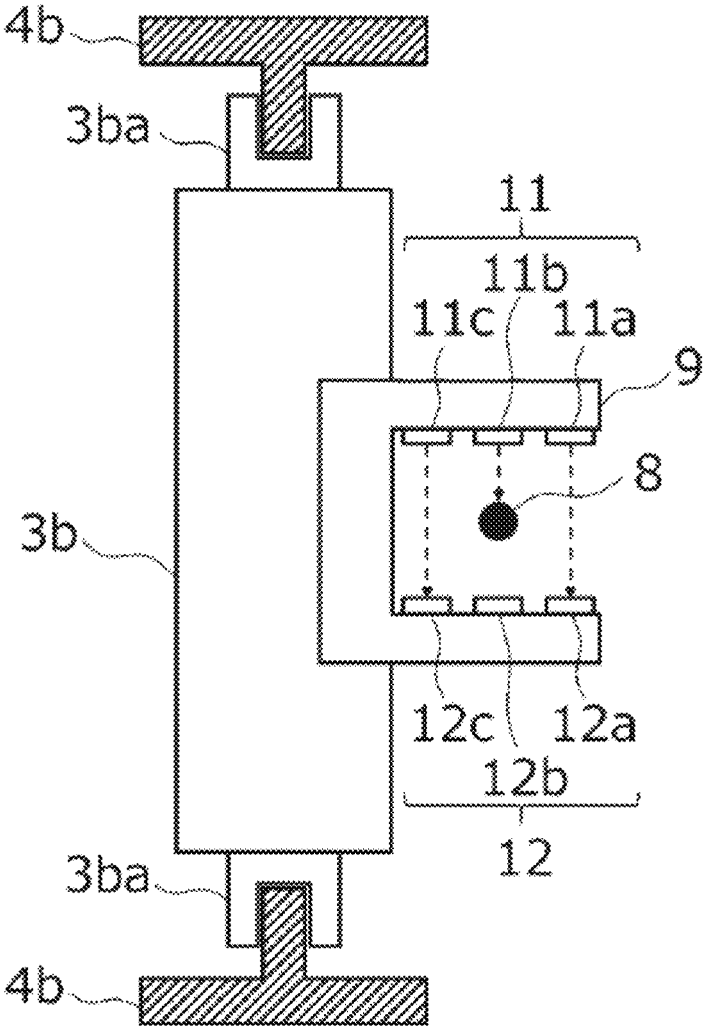
FIG. 3 is a plan of the counter weight and the photoelectric sensor according to the first embodiment.

As illustrated in FIG. 2, the photoelectric sensor 9 is provided on the counter weight 3*b*. Specifically, the photoelectric sensor 9 is attached to a center part of an upper end of the counter weight 3*b*. FIG. 3 illustrates a plan of the counter weight 3*b* and the photoelectric sensor 9. As illustrated in FIG. 3, the photoelectric sensor 9 is formed in a U shape. The photoelectric sensor 9 includes a light emitter 11*b* which is a first light emitter and the photodetector 12*b* which is a first photodetector. Further, the photoelectric sensor 9 includes a light emitter 11*a* which is a second light emitter, a light emitter 11*c* which is a third light emitter, the photodetector 12*a* which is a second photodetector, and the photodetector 12*c* which is a third photodetector. Note that the third light emitter may be the light emitter 11*a* and the third photodetector may be the photodetector 12*a*, and in this case, the second light emitter is the light emitter 11*c* and the second photodetector is the photodetector 12*c*.

In the following explanation, the light emitters 11*a*, 11*b* and 11*c* are called a light emitter 11 when not to be separately explained. In addition, in the following explanation, the photodetectors 12*a*. 12*b* and 12*c* are called a photodetector 12 when not to be separately explained.

The light emitter 11 includes a light emitting device such as a laser diode or a light emitting diode. The photodetector 12 includes a photo cell such as a phototransistor. The light emitter 11*a* is arranged facing the photodetector 12*a* in the depth direction, the light emitter 11*b* is arranged facing the photodetector 12*b* in the depth direction, and the light emitter 11*c* is arranged facing the photodetector 12*c* in the depth direction. The light emitter 11*b* performs irradiation of the light B which is first light, and the photodetector 12*b* receives the light B. The light emitter 11*a* performs the irradiation of the light A which is one of second light and third light, and the photodetector 12*a* receives the light A. The light emitter 11*c* performs the irradiation of the light C which is the other one of the second light and the third light, and the photodetector 12*c* receives the light C.

The light emitters 11*a* and 11*c* and the photodetectors 12*a* and 12*c* are arranged such that an optical path of the light B exists between an optical path of the light A and an optical path of the light C in a planar view. Specifically, the light emitter 11*b* is arranged between the light emitter 11*a* and the light emitter 11*c*, and the photodetector 12*b* is arranged between the photodetector 12*a* and the photodetector 12*c*. At the time, the optical paths of the light A, the light B and the light C are parallel with the depth direction. In the following explanation, the light A, the light B and the light C are called light when not to be separately explained. Note that the optical path indicates a path that the light of which the irradiation is performed from the light emitter 11 passes through before being received by the photodetector 12.

When the light of which the irradiation is performed from the light emitter 11 is received, the photodetector 12 outputs a photodetection signal which is an electric signal indicating that the light is received to a detector 13*b* to be described later via an input/output interface (not illustrated).

Figure 4:
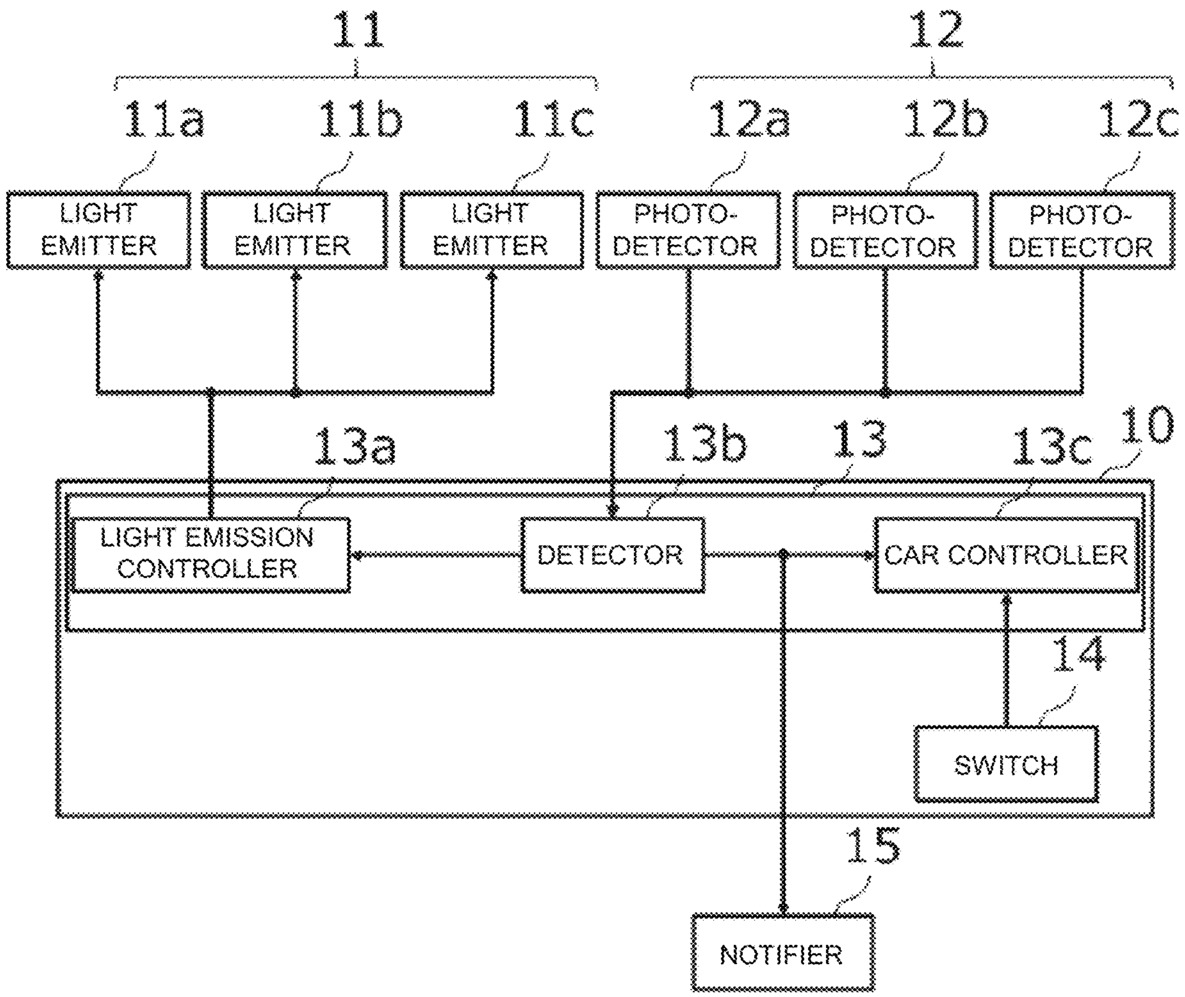
FIG. 4 is a configuration diagram of the elevating body derailment detection device according to the first embodiment.

The control device 10 is provided in the machine room 2 as illustrated in FIG. 1. In addition, as illustrated in FIG. 4, the control device 10 includes a controller 13 and the switch 14.

The controller 13 is a device such as a control board configured by a processor including a semiconductor integrated circuit, a memory and an input/output interface, and controls the entire elevator device. The controller 13 includes a light emission controller 13*a*, the detector 13*b* and a car controller 13*c*. A configuration example of a processing circuit of the controller 13 will be explained later.

The light emission controller 13*a* includes a software module that controls the light emitter 11.

The detector 13*b* includes a software module that detects that the counter weight 3*b* is detached from the counter weight guide rails 4*b* based on the photodetection signal outputted from the photodetector 12. In addition, the detector 13*b* includes a software module that outputs an operation stop signal to the car controller 13*c*. The operation stop signal is an electric signal that stops an operation of the elevating body 3.

The detector 13*b* includes a software module that detects that the photodetector 12*b* is in a short-circuit condition or the photodetector 12*b* is in a disconnection condition based on the photodetection signal outputted from the photodetector 12. The short-circuit condition of the photodetector 12*b* specifically indicates a condition where an emitter terminal and a collector terminal of the photo cell of the photodetector 12*b* are short-circuited. In addition, the disconnection condition of the photodetector 12*b* specifically indicates a condition where the emitter terminal and the collector terminal of the photo cell of the photodetector 12*b* are not electrically connected.

Further, the detector 13*b* includes a software module that outputs a derailment detection signal, a short-circuit detection signal and a disconnection detection signal to the notifier 15 to be described later. The derailment detection signal is an electric signal indicating that derailment of the counter weight 3*b* is detected. The short-circuit detection signal is an electric signal indicating that the short-circuit condition of the photodetector 12*b* is detected. The disconnection detection signal is an electric signal indicating that the disconnection condition of the photodetector 12*b* is detected.

The car controller 13*c* includes a software module that controls the operation of the elevating body 3 by controlling the traction machine 5.

The switch 14 is a device to be pressed by a worker when the worker repairs the derailment of the counter weight 3*b*, the short-circuit condition of the photodetector 12*b* and the disconnection condition of the photodetector 12*b*. When the switch 14 is pressed by the worker, the switch 14 outputs an operation stop release signal to the car controller 13*c*. Note that the derailment of the counter weight 3*b* indicates that the counter weight 3*b* is detached from the counter weight guide rails 4*b*. In addition, the operation stop release signal is an electric signal indicating that operation stop of the elevating body 3 is to be released.

The notifier 15 is a device that reports to the worker of the elevator device or the like. For example, the notifier 15 is an information terminal of a management company that manages the elevator device, an information center of an elevator device maintenance company, or a portable information terminal owned by the worker who executes maintenance and repair of the elevator device. In addition, the notifier 15 may be a lamp provided on the control device 10.

Next, a mechanism in which the detector 13*b* detects that the counter weight 3*b* is detached from the counter weight guide rails 4*b* based on the photodetection signal outputted from the photodetector 12 will be explained. First, a reception pattern of the photodetection signal received by the detector 13*b* will be explained with reference to FIG. 5. The reception pattern is a combination of existence or absence of reception of the photodetection signals outputted from the photodetectors 12*a*. 12*b* and 12*c*.

FIG. 5 is a figure illustrating the reception pattern of the photodetection signals received by the detector 13*b*. In FIG. 5. "ON" described in a column direction of "photodetector 12*a*", "photodetector 12*b*" and "photodetector 12*c*" indicates that the detector 13*b* has received the photodetection signal from the photodetector 12, and "OFF" indicates that the detector 13*b* has not received the photodetection signal from the photodetector 12.

There are six reception patterns for the detector 13*b*. The first one is a first reception pattern that the detector 13*b* receives the photodetection signals from the photodetectors 12*a* and 12*c* and does not receive the photodetection signal from the photodetector 12*b*. The second one is a second reception pattern that the detector 13*b* receives the photodetection signals from the photodetectors 12*b* and 12*c* and does not receive the photodetection signal from the photodetector 12*a*. The third one is a third reception pattern that the detector 13*b* receives the photodetection signals from the photodetectors 12*a* and 12*b* and does not receive the photodetection signal from the photodetector 12*c*. The fourth one is a fourth reception pattern that the detector 13*b* receives the photodetection signals from the photodetectors 12*a*, 12*b* and 12*c*. The fifth one is a fifth reception pattern that the detector 13*b* receives the photodetection signal from the photodetector 12*c* and does not receive the photodetection signal from the photodetectors 12*a* and 12*b*. The sixth one is a sixth reception pattern that the detector 13*b* receives the photodetection signal from the photodetector 12*a* and does not receive the photodetection signal from the photodetectors 12*b* and 12*c*.

Next, output of the photodetection signal of the photodetector 12 when the counter weight 3*b* is not detached from the counter weight guide rails 4*b* and the reception pattern of the detector 13*b* at the time will be explained. As illustrated in FIG. 3, when the counter weight 3*b* is not detached from the counter weight guide rails 4*b*, the wire 8 is arranged at the initial position. Thus, the photodetectors 12*a* and 12*c* receive the light A and the light C, but the photodetector 12*b* is blocked from receiving the light B by the wire 8. Accordingly, the photodetectors 12*a* and 12*c* output the photodetection signal and the photodetector 12*b* does not output the photodetection signal. At the time, the detector 13*b* receives the photodetection signal in the first pattern.

Figure 6:
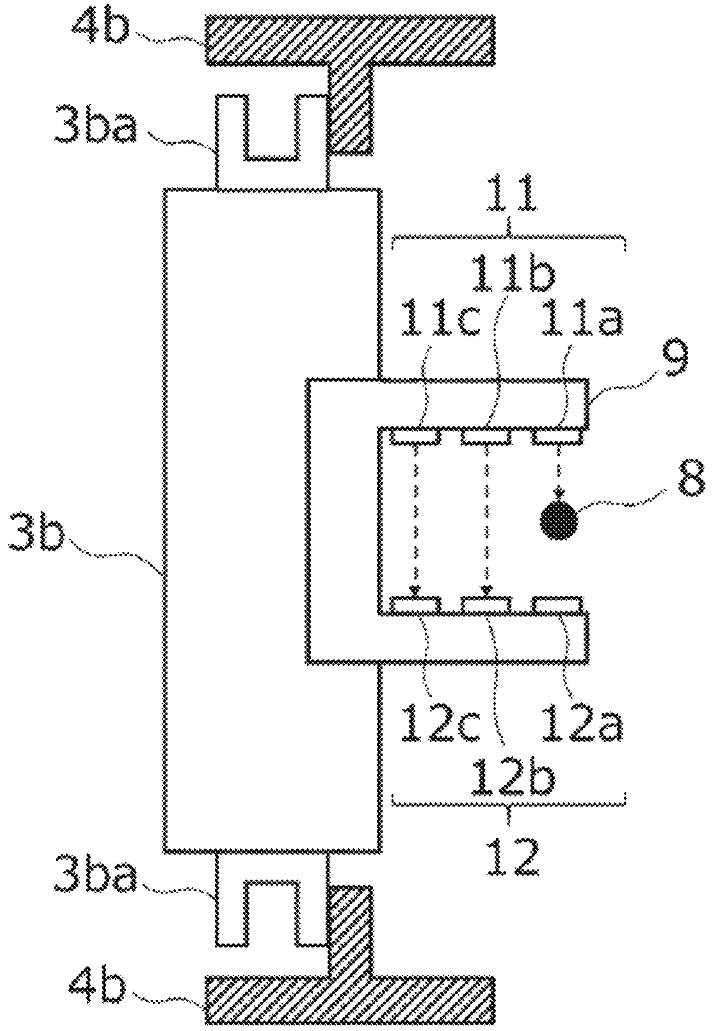
FIG. 6 is a plan of the counter weight and the photoelectric sensor according to the first embodiment when the counter weight is detached from the counter weight guide rail.

Next, the output of the photodetection signal of the photodetector 12 when the counter weight 3*b* is detached from the counter weight guide rails 4*b* and the reception pattern of the detector 13*b* at the time will be explained. As illustrated in FIG. 6, when the counter weight 3*b* is detached from the counter weight guide rails 4*b* so as to move away from the wire 8, the photoelectric sensor 9 moves such that the wire 8 deviates from the initial position. At the time, the photoelectric sensor 9 moves accompanying movement of the counter weight 3*b*. Then, the photodetectors 12*b* and 12*c* receive the light B and the light C. However, the photodetector 12*a* is blocked from receiving the light A by the wire 8. Thus, the photodetectors 12*b* and 12*c* output the photodetection signal and the photodetector 12*b* does not output the photodetection signal. At the time, the detector 13*b* receives the photodetection signal in the second pattern.

Figure 7:
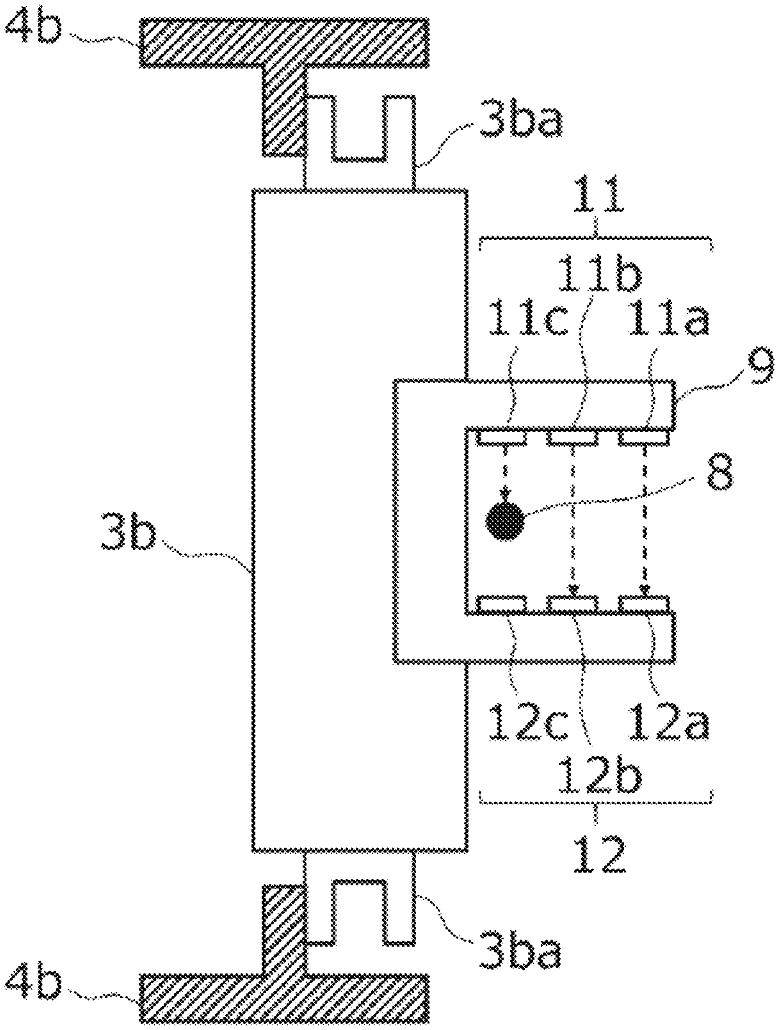
FIG. 7 is a plan of the counter weight and the photoelectric sensor according to the first embodiment when the counter weight is detached from the counter weight guide rail.

As illustrated in FIG. 7, when the counter weight 3*b* is detached from the counter weight guide rails 4*b* so as to approach the wire 8, the photoelectric sensor 9 moves such that the wire 8 deviates from the initial position. Then, the photodetectors 12*a* and 12*b* receive the light A and the light B. However, the photodetector 12*c* is blocked from receiving the light C by the wire 8. Thus, the photodetectors 12*a* and 12*b* output the photodetection signal and the photodetector 12*c* does not output the photodetection signal. At the time, the detector 13*b* receives the photodetection signal in the third pattern.

Figure 8:
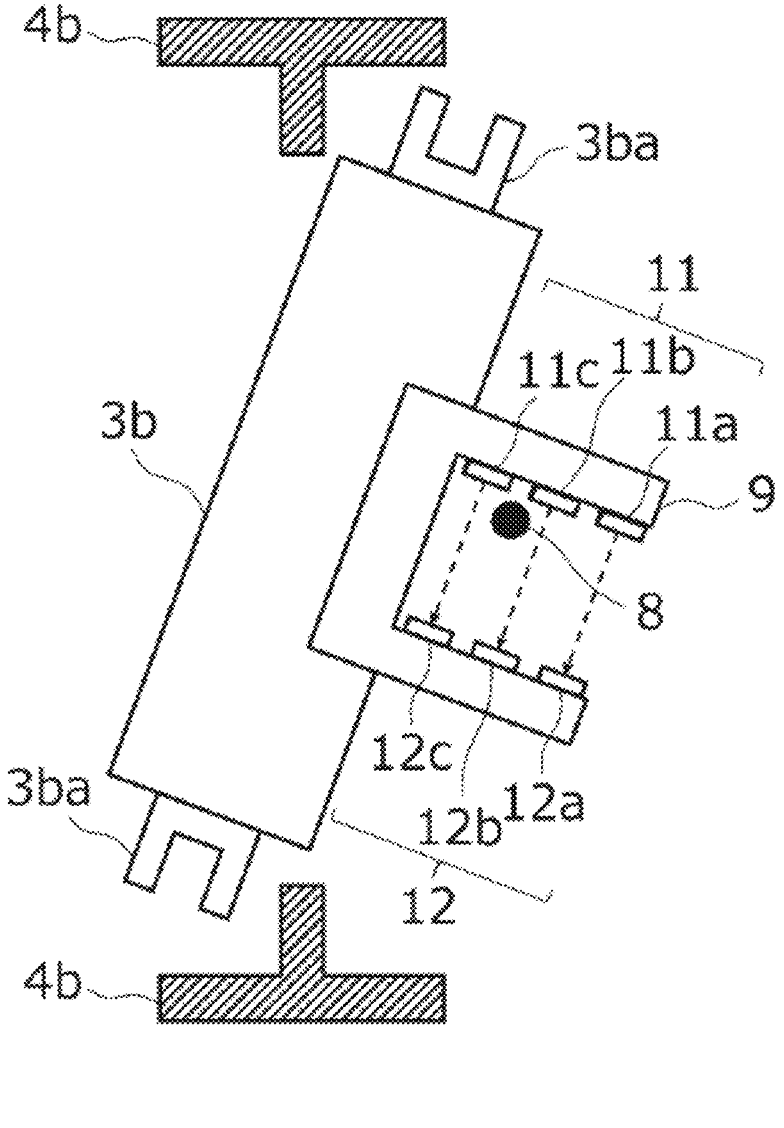
FIG. 8 is a plan of the counter weight and the photoelectric sensor according to the first embodiment when the counter weight is detached from the counter weight guide rail.

As illustrated in FIG. 8, when the counter weight 3*b* is detached from the counter weight guide rails 4*b* so as to rotate clockwise, the photoelectric sensor 9 moves such that the wire 8 deviates from the initial position. Then, the photodetectors 12*a*, 12*b* and 12*c* receive the light A, the light B and the light C. Thus, the photodetectors 12*a*, 12*b* and 12*c* output the photodetection signal. At the time, the detector 13*b* receives the photodetection signal in the fourth pattern.

From above, the detector 13*b* can detect that the counter weight 3*b* is detached from the counter weight guide rails 4*b* when the photodetection signal is received in the second reception pattern, the third reception pattern or the fourth reception pattern. In other words, the detector 13*b* can detect that the counter weight 3*b* is detached from the counter weight guide rails 4*b* when the photodetector 12*a* or the photodetector 12*c* does not receive the light A or the light C or the photodetector 12*b* receives the light B.

Next, a mechanism in which the detector 13*b* detects that the photodetector 12*b* is in the short-circuit condition based on the photodetection signal outputted from the photodetector 12 will be explained. In a case where the photodetector 12*b* is in the short-circuit condition, as illustrated in FIG. 6, when the counter weight 3*b* is detached from the counter weight guide rails 4*b* so as to move away from the wire 8, the photoelectric sensor 9 moves such that the wire 8 deviates from the initial position. Then, the photodetectors 12*b* and 12*c* receive the light B and the light C, and the photodetector 12*a* is blocked from receiving the light A by the wire 8.

Here, when the photodetector 12*b* is in the short-circuit condition, the photodetector 12*b* outputs the photodetection signal regardless of the existence or absence of photodetection of the light B. That is, even when the irradiation of the light B by the light emitter 11*b* is stopped, the photodetector 12 outputs the photodetection signal. Thus, in the case where the irradiation of the light B by the light emitter 11*b* is stopped, when the detector 13*b* receives the photodetection signal in the second reception pattern, the detector 13*b* can detect that the photodetector 12*b* is in the short-circuit condition. In other words, when the light emission controller 13*a* controls the light emitter 11*b* so as to stop the irradiation of the light B and the detector 13*b* receives the photodetection signal from the photodetector 12*b*, the detector 13*b* can detect that the photodetector 12*b* is in the short-circuit condition.

Also when the counter weight 3*b* is detached from the counter weight guide rails 4*b* so as to approach the wire 8 as illustrated in FIG. 7 or when the counter weight 3*b* is detached from the counter weight guide rails 4*b* so as to rotate clockwise as illustrated in FIG. 8, similarly to the above description, in the case where the irradiation of the light B by the light emitter 11*b* is stopped, the detector 13*b* can detect that the photodetector 12*b* is in the short-circuit condition when the detector 13*b* receives the photodetection signal in the third reception pattern or the fourth reception pattern.

Next, a mechanism in which the detector 13*b* detects that the photodetector 12*b* is in the disconnection condition based on the photodetection signal outputted from the photodetector 12 will be explained. In the case where the photodetector 12*b* is in the disconnection condition, when the counter weight 3*b* is detached from the counter weight guide rails 4*b* so as to move away from the wire 8 as illustrated in FIG. 6, the photoelectric sensor 9 moves such that the wire 8 deviates from the initial position. Then, the photodetectors 12*b* and 12*c* receive the light B and the light C. and the photodetector 12*a* is blocked from receiving the light A by the wire 8.

Here, when the photodetector 12*b* is in the disconnection condition, the photodetector 12*b* does not output the photodetection signal regardless of the existence or absence of the photodetection of the light B. That is, even when the irradiation of the light B is performed from the light emitter 11*b*, the photodetector 12*b* does not output the photodetection signal. Thus, when the detector 13*b* receives the photodetection signal in the fifth reception pattern, the detector 13*b* can detect that the photodetector 12*b* is in the disconnection condition. In other words, the detector 13*b* can detect that the photodetector 12*b* is in the disconnection condition when the photodetection signal is not received from the photodetector 12*b* and the photodetector 12*a* does not receive the light A.

Also when the counter weight 3*b* is detached from the counter weight guide rails 4*b* so as to approach the wire 8 as illustrated in FIG. 7, similarly to the above description, the detector 13*b* can detect that the photodetector 12*b* is in the disconnection condition when the detector 13*b* receives the photodetection signal in the sixth reception pattern. In other words, the detector 13*b* can detect that the photodetector 12*b* is in the disconnection condition when the photodetection signal is not received from the photodetector 12*b* and the photodetector 12*c* does not receive the light C.

In addition, when the detector 13*b* does not receive the photodetection signal from either one of the photodetector 12*a* and the photodetector 12*c*, it is recognized that the photodetector 12*a* or the photodetector 12*c* is blocked from receiving the light A or the light C by the wire 8 due to the movement of the photoelectric sensor 9. Thus, the detector 13*b* can simultaneously detect that the counter weight 3*b* is detached from the counter weight guide rails 4*b* when the photodetection signal is received in the fifth reception pattern or the sixth reception pattern.

Figure 9:
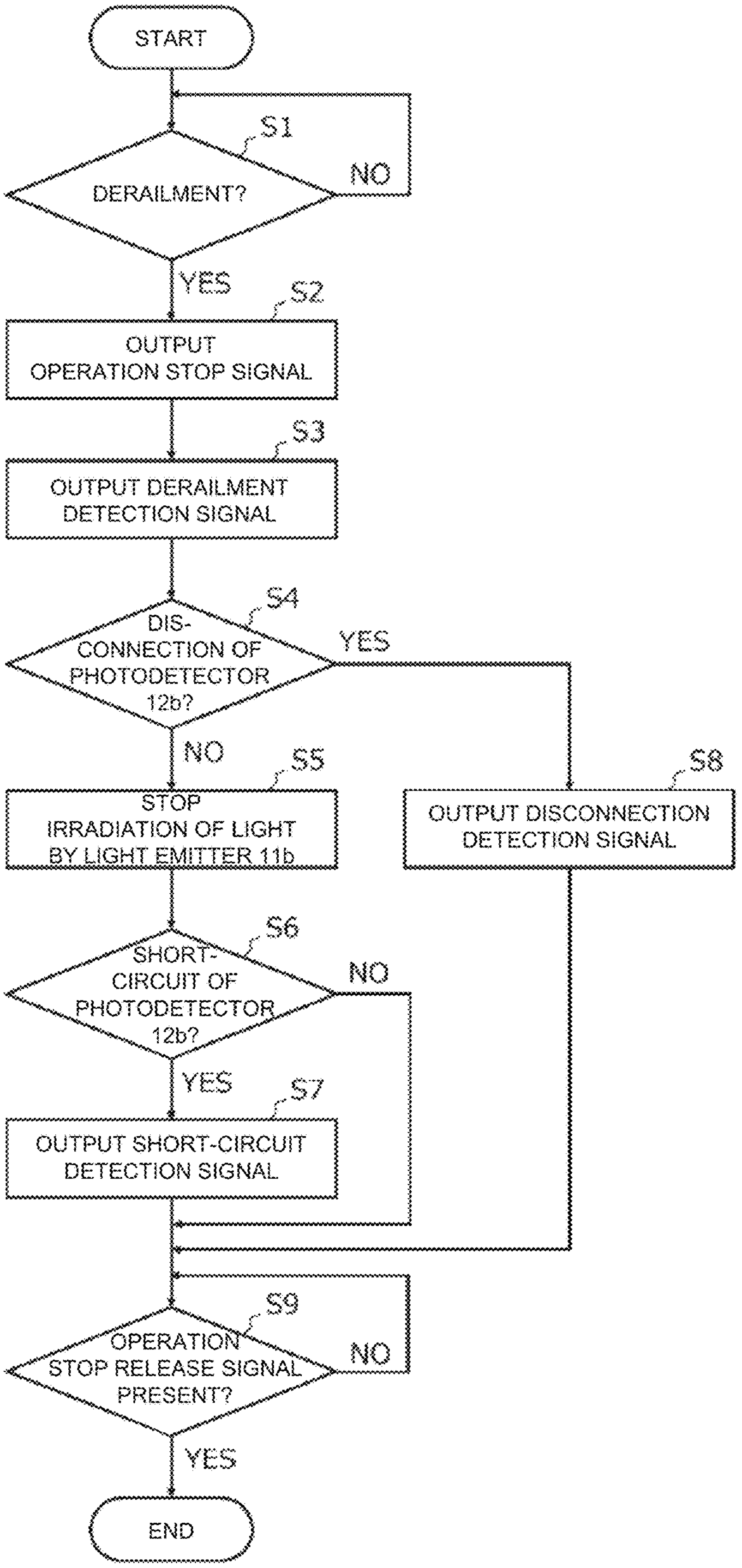
FIG. 9 is a flowchart illustrating processes in the controller according to the first embodiment.

Next, the operation of the present embodiment will be explained. FIG. 9 is a flowchart illustrating processes in the controller 13 of the control device 10.

In step S1, the detector 13*b* detects that the counter weight 3*b* is detached from the counter weight guide rails 4*b* based on the photodetection signal outputted from the photodetector 12. Specifically, the detector 13*b* receives the photodetection signal outputted by the photodetector 12. When the photodetection signal is received in the first reception pattern, the detector 13*b* does not detect that the counter weight 3*b* is detached from the counter weight guide rails 4*b*, and repeats step S1. On the other hand, when the photodetection signal is not received in the first reception pattern, that is, when the photodetection signal is received in the reception pattern which is one of the second reception pattern to the sixth reception pattern, the detector 13*b* detects that the counter weight 3*b* is detached from the counter weight guide rails 4*b*, and advances the process to step S2.

In step S2, the detector 13*b* outputs the operation stop signal to the car controller 13*c*. When the detector 13*b* outputs the operation stop signal to the car controller 13*c*, the car controller 13*c* controls the traction machine 5 so as to stop the operation of the elevating body 3. Therefore, the counter weight 3*b* is suppressed from being elevated and lowered inside the hoistway 1 in a condition of being detached from the counter weight guide rails 4*b*.

In step S3, the detector 13*b* outputs the derailment detection signal to the notifier 15. The notifier 15 reports to the worker of the elevator device or the like that the counter weight 3*b* is detached from the counter weight guide rails 4*b*.

In step S4, the detector 13*b* detects that the photodetector 12*b* is in the disconnection condition based on the photodetection signal outputted from the photodetector 12. When the photodetection signal is received in the fifth reception pattern or the sixth reception pattern, the detector 13*b* detects that the photodetector 12*b* is in the disconnection condition, and advances the process to step S8. On the other hand, when the photodetection signal is not received in the fifth reception pattern or the sixth reception pattern, that is, when the photodetection signal is received in the second reception pattern, the third reception pattern or the fourth reception pattern, the detector 13*b* does not detect that the photodetector 12*b* is in the disconnection condition, and advances the process to step S5.

In step S5, the light emission controller 13*a* controls the light emitter 11*b* so as to stop the irradiation of the light B.

In step S6, the detector 13*b* detects that the photodetector 12*b* is in the short-circuit condition based on the photodetection signal outputted from the photodetector 12. When the photodetection signal is received in the second reception pattern, the third reception pattern or the fourth reception pattern, the detector 13*b* detects that the photodetector 12*b* is in the short-circuit condition, and advances the process to step S7. On the other hand, when the photodetection signal is not received in the second reception pattern, the third reception pattern or the fourth reception pattern, the detector 13*b* does not detect that the photodetector 12*b* is in the short-circuit condition, and advances the process to step S9.

In step S7, the detector 13*b* outputs the short-circuit detection signal to the notifier 15. The notifier 15 reports to the worker of the elevator device or the like that the photodetector 12*b* is in the short-circuit condition.

In step S8, the detector 13*b* outputs the disconnection detection signal to the notifier 15. The notifier 15 reports to the worker of the elevator device or the like that the photodetector 12*b* is in the disconnection condition.

In step S9, the car controller 13*c* determines the existence or absence of the reception of the operation stop release signal outputted from the switch 14. The worker presses the switch 14 when the derailment of the counter weight 3*b*, the short-circuit condition of the photodetector 12*b* and the disconnection condition of the photodetector 12*b* are repaired. When the operation stop release signal is not received, the car controller 13*c* repeats step S9. When the operation stop release signal is received, the car controller 13*c* releases the operation stop of the elevating body 3. Then, the process ends.

As above, the elevating body derailment detection device according to the first embodiment includes the photoelectric sensor 9 provided on the counter weight 3*b* and including the light emitter 11*b* which performs the irradiation of the light B and the photodetector 12*b* which receives the light B, and the wire 8 provided in parallel with the elevating and lowering direction of the elevating body 3 and arranged at a position to block the photodetector 12*b* from receiving the light B between the light emitter 11*b* and the photodetector 12*b*. The photodetector 12*b* receives the light B in response to the photoelectric sensor 9 moving such that the wire 8 deviates from the position. The detector 13*b* detects that the counter weight 3*b* is detached from the counter weight guide rails 4*b* when the photodetector 12*b* receives the light B. By such a configuration, it can be detected that the counter weight 3*b* is detached from the counter weight guide rails 4*b* in an early stage.

Further, the elevating body derailment detection device according to the first embodiment further includes the light emission controller 13*a* which controls the light emitter 11*b*. When the light emission controller 13*a* controls the light emitter 11*b* so as to stop the irradiation of the light B and the detector 13*b* receives the photodetection signal from the photodetector 12*b*, the detector 13*b* detects that the photodetector 12*b* is in the short-circuit condition. Therefore, the short-circuit condition of the photodetector 12*b* which is anomaly of the elevating body derailment detection device can be detected.

Furthermore, in the elevating body derailment detection device according to the first embodiment, the photoelectric sensor 9 further includes the light emitter 11*a* which performs the irradiation of the light A and the photodetector 12*a* which receives the light A. The wire 8 is arranged at a position to block the photodetector 12*b* from receiving the light B and not to block the photodetector 12*a* from receiving the light A. In response to the photoelectric sensor 9 moving such that the wire 8 deviates from the position, the photodetector 12*b* receives the light B and the photodetector 12*a* is blocked from receiving the light A by the wire 8. When the photodetection signal is not received from the photodetector 12*b* and the photodetector 12*a* does not receive the light A, the detector 13*b* detects that the photodetector 12*b* is in the disconnection condition. Therefore, the disconnection condition of the photodetector 12*b* which is the anomaly of the elevating body derailment detection device can be detected.

Furthermore, in the elevating body derailment detection device according to the first embodiment, the photoelectric sensor 9 further includes the light emitter 11*c* which performs the irradiation of the light C and the photodetector 12*c* which receives the light C. The wire 8 is arranged at a position to block the photodetector 12*b* from receiving the light B and not to block the photodetector 12*c* from receiving the light C. In response to the photoelectric sensor 9 moving such that the wire 8 deviates from the position, the photodetector 12*b* receives the light B and the photodetector 12*c* is blocked from receiving the light C by the wire 8. When the photodetection signal is not received from the photodetector 12*b* and the photodetector 12*c* does not receive the light C, the detector 13*b* detects that the photodetector 12*b* is in the disconnection condition. Therefore, the disconnection condition of the photodetector 12*b* which is the anomaly of the elevating body derailment detection device can be detected.

Moreover, in the elevating body derailment detection device according to the first embodiment, the photoelectric sensor 9 further includes the light emitter 11*a* which performs the irradiation of the light A and the photodetector 12*a* which receives the light A, and the light emitter 11*c* which performs the irradiation of the light C and the photodetector 12*c* which receives the light C. The wire 8 is arranged at a position to block the photodetector 12*b* from receiving the light B, not to block the photodetector 12*a* from receiving the light A and not to block the photodetector 12*c* from receiving the light C. The light emitters 11$a$ and 11$c$ and the photodetectors 12$a$ and 12$c$ are arranged such that the optical path of the light B exists between the optical path of the light A and the optical path of the light C in the planar view. When the signal indicating that the light B is received is not received from the photodetector 12$b$ and the photodetector 12$b$ does not receive the light B or the photodetector 12$c$ does not receive the light C, the detector 13$b$ detects that the photodetector 12$b$ is in the disconnection condition. Therefore, even when the counter weight 3$b$ is detached from the counter weight guide rails 4$b$ so as to move away from the wire 8 or when the counter weight 3$b$ is detached from the counter weight guide rails 4$b$ so as to approach the wire 8, the disconnection condition of the photodetector 12$b$ which is the anomaly of the elevating body derailment detection device can be detected.

An example of providing the photoelectric sensor 9 on the counter weight 3$b$ and detecting that the counter weight 3$b$ is detached from the counter weight guide rails 4$b$ has been explained, however, the photoelectric sensor 9 may be provided on the car 3$a$ and it may be detected that the car 3$a$ is detached from the car guide rails 4$a$.

An example of attaching the photoelectric sensor 9 to the upper end of the counter weight 3$b$ has been explained, however, the photoelectric sensor 9 may be attached to any position of the counter weight 3$b$. For example, the photoelectric sensor 9 may be attached to a lower end of the counter weight 3$b$.

An example of arranging the light emitter 11$b$ between the light emitter 11$a$ and the light emitter 11$c$ and arranging the photodetector 12$b$ between the photodetector 12$a$ and the photodetector 12$c$ has been explained, however, the light emitters 11$a$ and 11$c$ and the photodetectors 12$a$ and 12$c$ may be arranged such that the optical path of the light B exists between the optical path of the light A and the optical path of the light C in the planar view. For example, the photodetector 12$b$ may be arranged between the light emitter 11$a$ and the light emitter 11$e$ and the light emitter 11$b$ may be arranged between the photodetector 12$a$ and the photodetector 12$c$.

Second Embodiment

In the first embodiment, the example that the photodetector 12$b$ is blocked from receiving the light B by the wire 8 has been explained. In a second embodiment, an example that the photodetector 12$b$ is blocked from receiving the light B by the counter weight guide rail 4$b$ will be explained. Specifically, since the position where the photoelectric sensor 9 is provided and the processes of the controller 13 are different from that in the first embodiment, differences will be explained below.

Figure 10:
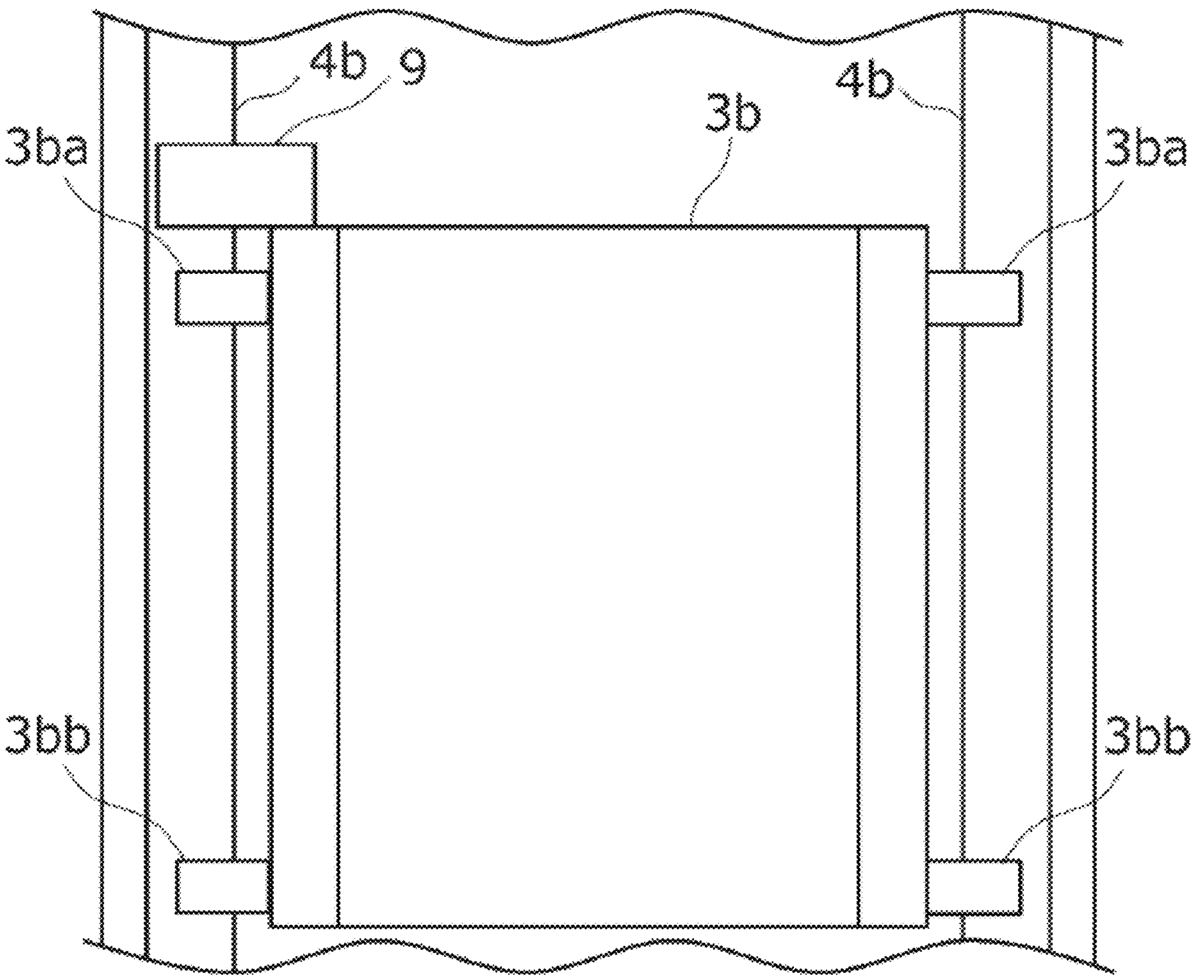
FIG. 10 is a side view of a counter weight and a photoelectric sensor according to a second embodiment.
Figure 11:
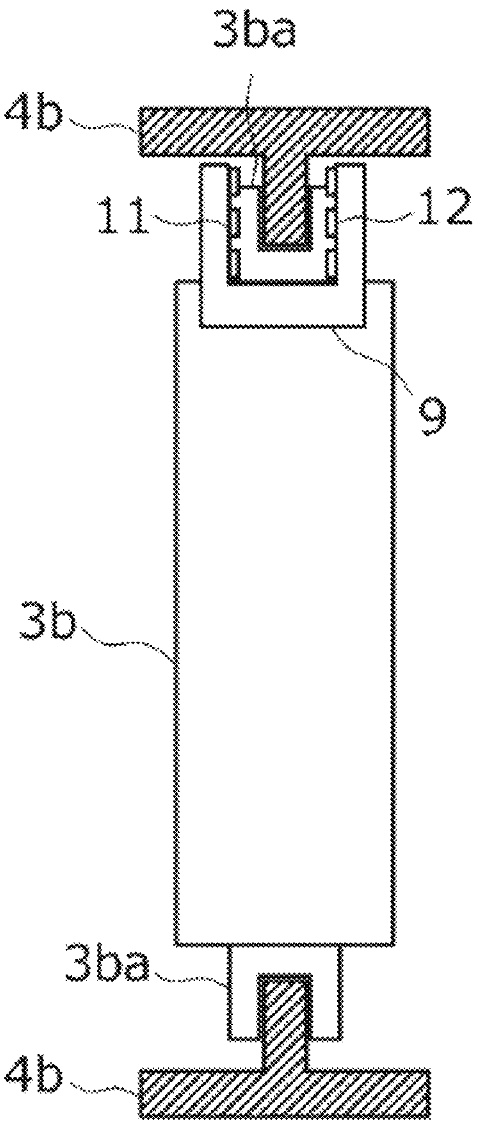
FIG. 11 is a plan of the counter weight and the photoelectric sensor according to the second embodiment.
Figure 15:
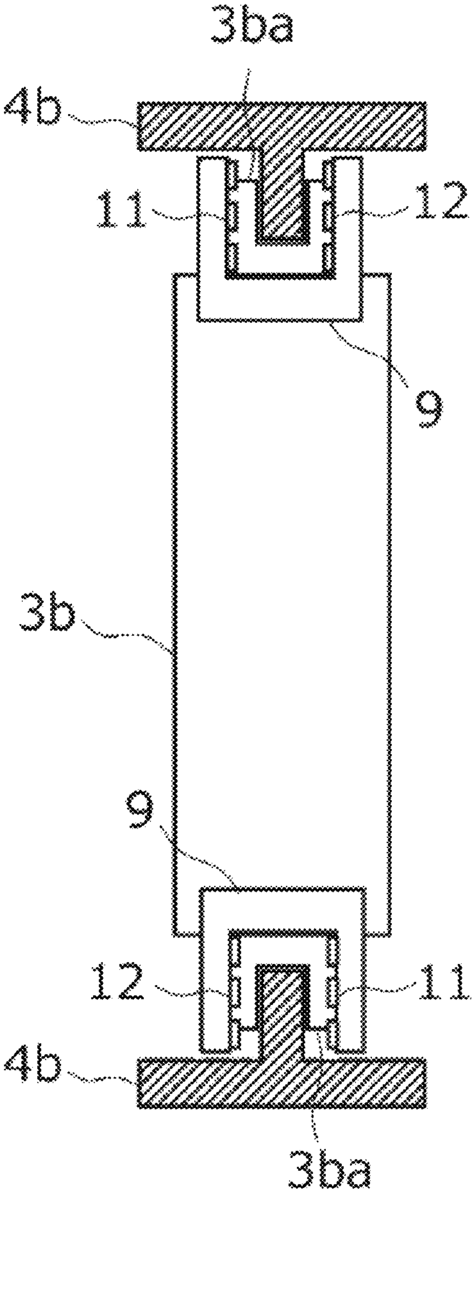
FIG. 15 is a plan of the counter weight and the photoelectric sensor according to a variation of the second embodiment.

FIG. 10 illustrates a side view of the counter weight 3$b$ and the photoelectric sensor 9. As illustrated in FIG. 10, the photoelectric sensor 9 is provided on the counter weight 3$b$. Specifically, the photoelectric sensor 9 is attached to a position facing the counter weight guide rail 4$b$, at the upper end of the counter weight 3$b$. In FIG. 10 and FIG. 11 and FIG. 15 to be explained below, the illustration of the suspension body 7 is omitted.

Figure 12:
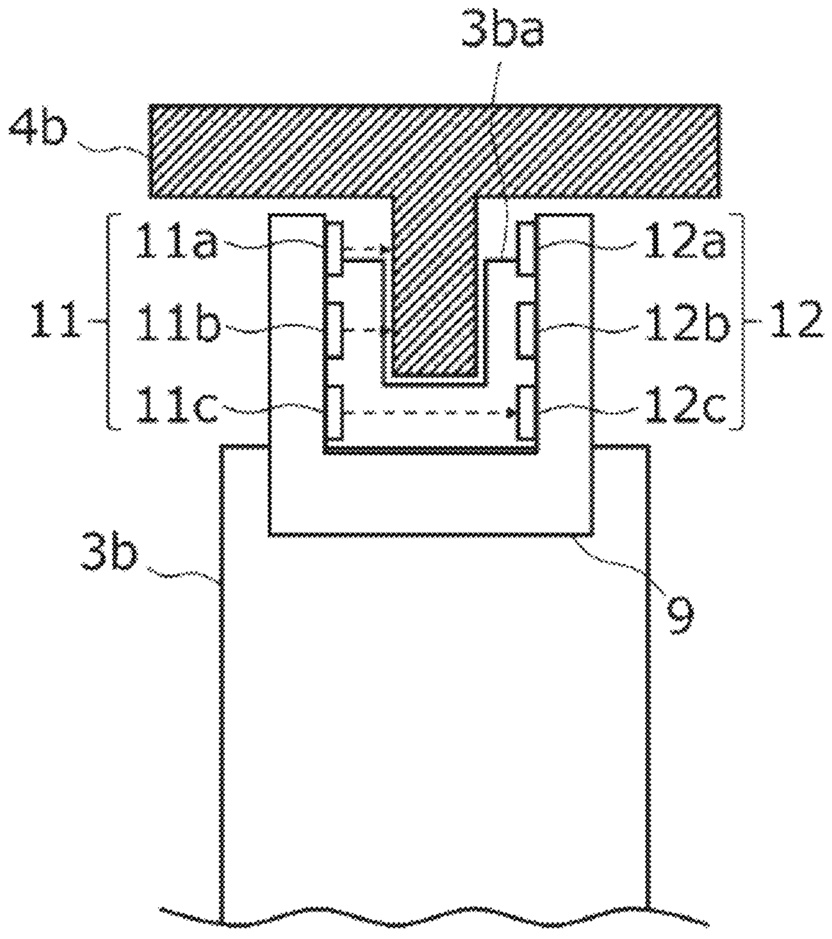
FIG. 12 is an enlarged plan of the counter weight and the photoelectric sensor according to the second embodiment.

FIG. 11 illustrates a plan of the counter weight 3$b$ and the photoelectric sensor 9, and FIG. 12 illustrates a figure for which the plan of the counter weight 3$b$ and the photoelectric sensor 9 is enlarged. As illustrated in FIG. 11 and FIG. 12, the light emitter 11$a$ is arranged facing the photodetector 12$a$ in the crosswise direction, the light emitter 11$b$ is arranged facing the photodetector 12$b$ in the crosswise direction, and the light emitter 11$c$ is arranged facing the photodetector 12$c$ in the crosswise direction. The optical path of the light A of which the irradiation is performed by the light emitter 11$a$, the optical path of the light B of which the irradiation is performed by the light emitter 11$b$ and the optical path of the light C of which the irradiation is performed by the light emitter 11$c$ are parallel in the crosswise direction.

The light emitters 11$a$ and 11$b$ and the photodetectors 12$a$ and 12$b$ are arranged at such positions that the photodetectors 12$a$ and 12$b$ are blocked from receiving the light A and the light B by the counter weight guide rail 4$b$ when the counter weight 3$b$ is not detached from the counter weight guide rail 4$b$. In addition, the light emitter 11$c$ and the photodetector 12$c$ are arranged at such positions that the photodetector 12$c$ is not blocked from receiving the light C by the counter weight guide rail 4$b$ when the counter weight 3$b$ is not detached from the counter weight guide rail 4$b$. In other words, the photoelectric sensor 9 is attached to the position where the photodetectors 12$a$ and 12$b$ are blocked from receiving the light A and the light B by the counter weight guide rail 4$b$ when the counter weight 3$b$ is not detached from the counter weight guide rail 4$b$.

Next, the mechanism in which the detector 13$b$ detects that the counter weight 3$b$ is detached from the counter weight guide rails 4$b$ based on the photodetection signal outputted from the photodetector 12 will be explained. First, the reception pattern of the photodetection signal received by the detector 13$b$ will be explained with reference to FIG. 13.

FIG. 13 is a figure illustrating the reception pattern of the photodetection signals received by the detector 13$b$. In FIG. 13. "ON" described in the column direction of "photodetector 12$a$", "photodetector 12$b$" and "photodetector 12$c$" indicates that the detector 13$b$ has received the photodetection signal from the photodetector 12, and "OFF" indicates that the detector 13$b$ has not received the photodetection signal from the photodetector 12.

There are three reception patterns for the detector 13$b$. The first one is a seventh reception pattern that the detector 13$b$ receives the photodetection signal from the photodetector 12$c$ and does not receive the photodetection signal from the photodetectors 12$a$ and 12$b$. The second one is an eighth reception pattern that the detector 13$b$ receives the photodetection signals from the photodetectors 12$a$, 12$b$ and 12$c$. The third one is a ninth reception pattern that the detector 13$b$ receives the photodetection signals from the photodetectors 12$a$ and 12$c$ and does not receive the photodetection signal from the photodetector 12$b$.

Next, the output of the photodetection signal of the photodetector 12 when the counter weight 3$b$ is not detached from the counter weight guide rails 4$b$ and the reception pattern of the detector 13$b$ at the time will be explained. As illustrated in FIG. 12, when the counter weight 3$b$ is not detached from the counter weight guide rails 4$b$, the photodetector 12$c$ receives the light C, but the photodetectors 12$a$ and 12$b$ are blocked from receiving the light A and the light B by the counter weight guide rail 4$b$. Thus, the photodetector 12$c$ outputs the photodetection signal and the photodetectors 12$a$ and 12$b$ do not output the photodetection signal. At the time, the detector 13$b$ receives the photodetection signal in the seventh pattern.

Figure 14:
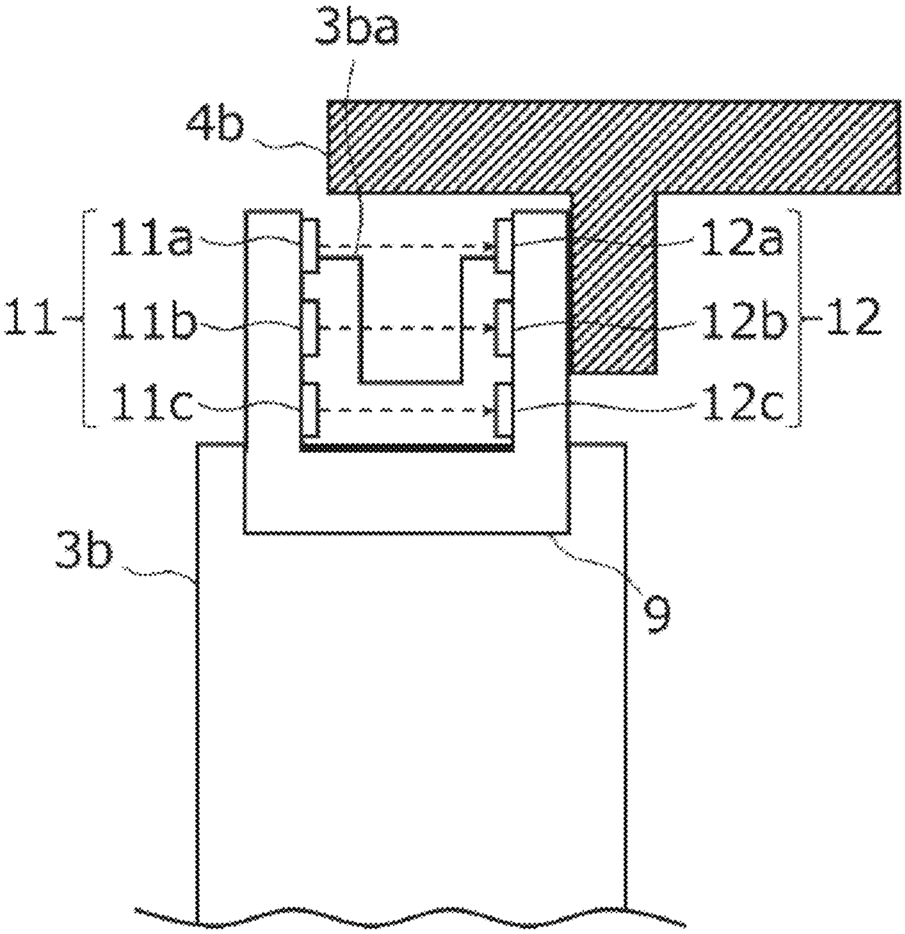
FIG. 14 is an enlarged plan of the counter weight and the photoelectric sensor according to the second embodiment when the counter weight is detached from the counter weight guide rail

Next, the output of the photodetection signal of the photodetector 12 when the counter weight 3$b$ is detached from the counter weight guide rails 4$b$ and the reception pattern of the detector 13$b$ at the time will be explained. As illustrated in FIG. 14, when the counter weight 3$b$ is detached from the counter weight guide rails 4*b*, the photoelectric sensor 9 moves from the position where the photodetectors 12*a* and 12*b* are blocked from receiving the light A and the light B by the counter weight guide rail 4*b*. At the time, the photoelectric sensor 9 moves accompanying the movement of the counter weight 3*b*. Then, the photodetectors 12*a*, 12*b* and 12*c* receive the light A, the light B and the light C. Thus, the photodetectors 12*a*, 12*b* and 12*c* output the photodetection signal. At the time, the detector 13*b* receives the photodetection signal in the eighth pattern.

From above, the detector 13*b* can detect that the counter weight 3*b* is detached from the counter weight guide rails 4*b* when the photodetection signal is received in the eighth reception pattern. In other words, the detector 13*b* can detect that the counter weight 3*b* is detached from the counter weight guide rails 4*b* when the photodetectors 12*a* and 12*b* receive the light A and the light B.

Next, the mechanism in which the detector 13*b* detects that the photodetector 12*b* is in the short-circuit condition based on the photodetection signal outputted from the photodetector 12 will be explained. In the case where the photodetector 12*b* is in the short-circuit condition, as illustrated in FIG. 14, when the counter weight 3*b* is detached from the counter weight guide rails 4*b*, the photoelectric sensor 9 moves from the position where the photodetectors 12*a* and 12*b* are blocked from receiving the light A and the light B by the counter weight guide rail 4*b*. Then, the photodetectors 12*a*, 12*b* and 12*c* receive the light A, the light B and the light C.

Here, when the photodetector 12*b* is in the short-circuit condition, the photodetector 12*b* outputs the photodetection signal regardless of the existence or absence of the photodetection of the light B. That is, even when the irradiation of the light B by the light emitter 11*b* is stopped, the photodetector 12 outputs the photodetection signal. Thus, in the case where the irradiation of the light B by the light emitter 1/1*b* is stopped, when the detector 13*b* receives the photodetection signal in the eighth reception pattern, the detector 13*b* can detect that the photodetector 12*b* is in the short-circuit condition. In other words, when the light emission controller 13*a* controls the light emitter 11*b* so as to stop the irradiation of the light B and the detector 13*b* receives the photodetection signal from the photodetector 12*b*, the detector 13*b* can detect that the photodetector 12*b* is in the short-circuit condition.

Next, the mechanism in which the detector 13*b* detects that the photodetector 12*b* is in the disconnection condition based on the photodetection signal outputted from the photodetector 12 will be explained. In the case where the photodetector 12*b* is in the disconnection condition, when the counter weight 3*b* is detached from the counter weight guide rails 4*b* as illustrated in FIG. 14, the photoelectric sensor 9 moves from the position where the photodetectors 12*a* and 12*b* are blocked from receiving the light A and the light B by the counter weight guide rail 4*b*. Then, the photodetectors 12*a*, 12*b* and 12*c* receive the light A, the light B and the light C.

Here, when the photodetector 12*b* is in the disconnection condition, the photodetector 12*b* does not output the photodetection signal regardless of the existence or absence of the photodetection of the light B. That is, even when the irradiation of the light B is performed from the light emitter 11*b*, the photodetector 12*b* does not output the photodetection signal. Thus, when the detector 13*b* receives the photodetection signal in the ninth reception pattern, the detector 13*b* can detect that the photodetector 12*b* is in the disconnection condition. In other words, the detector 13*b* can detect that the photodetector 12*b* is in the disconnection condition when the photodetection signal is not received from the photodetector 12*b* and the photodetector 12*a* receives the light A.

In addition, when the detector 13*b* receives the photodetection signal from the photodetector 12*a*, it is recognized that the photodetector 12*a* receives the light A due to the movement of the photoelectric sensor 9. Thus, the detector 13*b* can simultaneously detect that the counter weight 3*b* is detached from the counter weight guide rails 4*b* when the photodetection signal is received in the ninth reception pattern.

Next, the operation of the present embodiment will be explained with reference to FIG. 9. In the present embodiment, the processes in step S1, step S4 and step S6 among the processes of the controller 13 are different from that in the first embodiment so that the processes will be explained.

In step S1, the detector 13*b* detects that the counter weight 3*b* is detached from the counter weight guide rails 4*b* based on the photodetection signal outputted from the photodetector 12. Specifically, the detector 13*b* receives the photodetection signal outputted by the photodetector 12. When the photodetection signal is received in the seventh reception pattern, the detector 13*b* does not detect that the counter weight 3*b* is detached from the counter weight guide rails 4*b*, and repeats step S1. On the other hand, when the photodetection signal is not received in the seventh reception pattern, that is, when the photodetection signal is received in the eighth reception pattern or the ninth reception pattern, the detector 13*b* detects that the counter weight 3*b* is detached from the counter weight guide rails 4*b*, and advances the process to step S2.

In step S4, the detector 13*b* detects that the photodetector 12*b* is in the disconnection condition based on the photodetection signal outputted from the photodetector 12. When the photodetection signal is received in the ninth reception pattern, the detector 13*b* detects that the photodetector 12*b* is in the disconnection condition, and advances the process to step S8. On the other hand, when the photodetection signal is not received in the ninth reception pattern, that is, when the photodetection signal is received in the eighth reception pattern, the detector 13*b* does not detect that the photodetector 12*b* is in the disconnection condition, and advances the process to step S5.

In step S6, the detector 13*b* detects that the photodetector 12*b* is in the short-circuit condition based on the photodetection signal outputted from the photodetector 12. When the photodetection signal is received in the eighth reception pattern, the detector 13*b* detects that the photodetector 12*b* is in the short-circuit condition, and advances the process to step S7. On the other hand, when the photodetection signal is not received in the eighth reception pattern, the detector 13*b* does not detect that the photodetector 12*b* is in the short-circuit condition, and advances the process to step S9.

As above, the elevating body derailment detection device according to the second embodiment includes the photoelectric sensor 9 provided on the counter weight 3*b*, including the light emitter 11*b* which performs the irradiation of the light B and the photodetector 12*b* which receives the light B, and attached at the position where the photodetector 12*b* is blocked from receiving the light B by the counter weight guide rail 4*b*, and the detector 13*b* which detects that the counter weight 3*b* is detached from the counter weight guide rails 4*b*. The photodetector 12*b* receives the light B in response to the photoelectric sensor 9 moving from the position. The detector 13*b* detects that the counter weight 3*b* is detached from the counter weight guide rails 4*b* when the photodetector 12*b* receives the light B. By such a configuration, it can be detected that the counter weight 3*b* is detached from the counter weight guide rails 4*b* in an early stage.

Further, in the elevating body derailment detection device according to the second embodiment, the photoelectric sensor 9 further includes the light emitter 11*a* which performs the irradiation of the light A and the photodetector 12*a* which receives the light A. The photoelectric sensor 9 is attached to the position where the photodetectors 12*a* and 12*b* are blocked from receiving the light A and the light B by the counter weight guide rail 4*b*. In response to the photoelectric sensor 9 moving from the position, the photodetectors 12*a* and 12*b* receive the light A and the light B. When the photodetection signal is not received from the photodetector 12*b* and the photodetector 12*a* receives the light A, the detector 13*b* detects that the photodetector 12*b* is in the disconnection condition. Therefore, the disconnection condition of the photodetector 12*b* which is the anomaly of the elevating body derailment detection device can be detected.

As illustrated in FIG. 15, two photoelectric sensors 9 may be provided. In this case, each of the two photoelectric sensors 9 is attached to the position facing the counter weight guide rail 4*b*, at the upper end of the counter weight 3*b*. By such a configuration, even when one of both ends of the counter weight 3*b* is detached from the counter weight guide rail 4*b*, the derailment of the counter weight 3*b* can be surely detected.

Also in the second embodiment, the photoelectric sensor 9 may be provided on the car 3*a* and it may be detected that the car 3*a* is detached from the car guide rails 4*a*, similarly to the first embodiment.

Note that the photoelectric sensor 9 may be arranged to any position where the photodetector 12*b* is blocked from receiving the light B by the counter weight guide rail 4*b*. For example, the photoelectric sensor 9 may be attached to the lower end of the counter weight 3*b*.

Figure 16A:
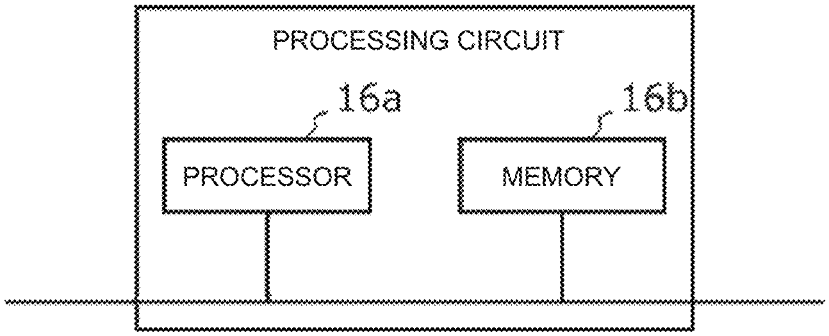
FIG. 16A and FIG. 16B are figures illustrating the configuration example of processing circuitry of the controller in the first embodiment.
Figure 16B:
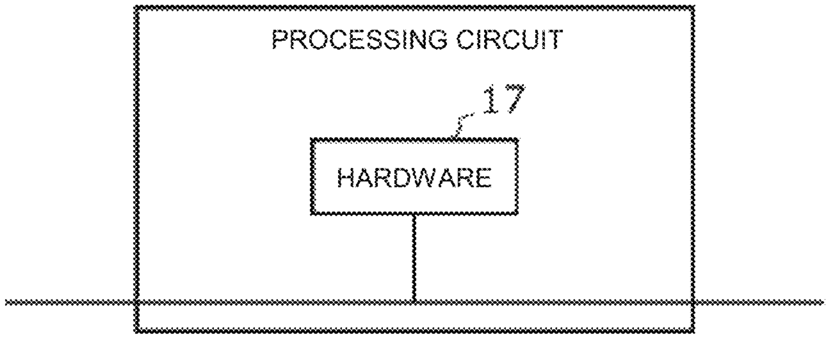

With reference to FIG. 16A and FIG. 16B, the configuration example of the processing circuit of the controller 13 will be explained. FIG. 16A and FIG. 16B are figures illustrating the configuration example of the processing circuit of the controller 13 in the first embodiment. Note that the configuration example of the processing circuit of the controller 13 is similar in the second embodiment.

Individual functions of the controller 13 can be achieved by the processing circuit. For example, the processing circuit includes at least one processor 16*a* and at least one memory 16*b*. In addition, for example, the processing circuit includes at least one piece of exclusive hardware 17.

In the case where the processing circuit includes at least one processor 16*a* and at least one memory 16*b*, the individual functions of the controller 13 are achieved by software, firmware, or the combination of the software and the firmware. At least one of the software and the firmware is described as a program. At least one of the software and the firmware is stored in the at least one memory 16*b*. The at least one processor 16*a* achieves the functions of the controller 13 by reading and executing the program stored in the at least one memory 16*b*. The at least one processor 16*a* is also called a CPU (central processing unit), a central processor, a processing unit, an arithmetic operation unit, a microprocessor, a microcomputer or a DSP. For example, the at least one memory 16*b* is a non-volatile or a volatile semiconductor memory such as a RAM, a ROM, a flash memory, an EPROM and an EEPROM, a magnetic disk, a flexible disk, an optical disk, a compact disk, a mini disk or a DVD.

In the case where the processing circuit includes at least one piece of the exclusive hardware 17, the processing circuit is achieved by, for example, a single circuit, a composite circuit, a programmed processor, a parallelly-programmed processor, an ASIC, an FPGA or the combination thereof. For example, each of the individual functions of the controller 13 is achieved by the processing circuit. For example, the individual functions of the controller 13 are achieved by the processing circuit altogether.

For the individual functions of the controller 13, some may be achieved by the exclusive hardware 17 and the rest may be achieved by the software or the firmware.

In such a manner, the processing circuit achieves the individual functions of the controller 13 by the hardware 17, the software, the firmware or the combination thereof.

Hereinafter, various aspects of the present disclosure will be described altogether.

(Supplement 1)

An elevating body derailment detection device including:

a photoelectric sensor provided on an elevating body elevated and lowered along a guide rail and including a first light emitter which performs irradiation of first light and a first photodetector which receives the first light;

a wire provided in parallel with an elevating and lowering direction of the elevating body and arranged at a position to block the first photodetector from receiving the first light between the first light emitter and the first photodetector; and a detector configured to detect that the elevating body is detached from the guide rail, wherein the first photodetector receives the first light in response to the photoelectric sensor moving such that the wire deviates from the position, and the detector detects that the elevating body is detached from the guide rail when the first photodetector receives the first light.

(Supplement 2)

The elevating body derailment detection device according to supplement 1, further including a light emission controller configured to control the first light emitter, wherein when the light emission controller controls the first light emitter so as to stop the irradiation of the first light and the detector receives, from the first photodetector, a signal indicating that the first light is received, the detector detects that the first photodetector is in a short-circuit condition.

(Supplement 3)

The elevating body derailment detection device according to supplement 1 or 2, wherein the photoelectric sensor further includes a second light emitter which performs irradiation of second light and a second photodetector which receives the second light, the position of the wire is a position to block the first photodetector from receiving the first light and not to block the second photodetector from receiving the second light, the first photodetector receives the first light and the second photodetector is blocked from receiving the second light by the wire in response to the photoelectric sensor moving such that the wire deviates from the position, and when the signal indicating that the first light is received is not received from the first photodetector and the second photodetector does not receive the second light, the detector detects that the first photodetector is in a disconnection condition.

(Supplement 4)

The elevating body derailment detection device according to supplement 3, wherein the photoelectric sensor further includes a third light emitter which performs irradiation of third light and a third photodetector which receives the third light, the position of the wire is a position to block the first photodetector from receiving the first light, not to block the second photodetector from receiving the second light and not to block the third photodetector from receiving the third light, the second light emitter, the second photodetector, the third light emitter and the third photodetector are arranged such that an optical path of the first light exists between an optical path of the second light and an optical path of the third light in a planar view, and when the signal indicating that the first light is received is not received from the first photodetector and the second photodetector does not receive the second light or the third photodetector does not receive the third light, the detector detects that the first photodetector is in the disconnection condition.

(Supplement 5)

An elevating body derailment detection device including:

a photoelectric sensor provided on an elevating body elevated and lowered along a guide rail, including a light emitter which performs irradiation of light and a photodetector which receives the light, and attached to a position where the photodetector is blocked from receiving the light by the guide rail; and a detector configured to detect that the elevating body is detached from the guide rail, wherein the photodetector receives the light in response to the photoelectric sensor moving from the position, and the detector detects that the elevating body is detached from the guide rail when the photodetector receives the light.

According to the elevating body derailment detection device according to the present disclosure, it can be detected that an elevating body is detached from a guide rail in an early stage.

Obviously many modifications and variations of the present disclosure are possible in the light of the above teachings. It is therefore to be understood that within the scope of the appended claims the disclosure may be practiced otherwise than as specifically described.

The invention claimed is:

1. An elevating body derailment detection device comprising:

a photoelectric sensor provided on an elevating body elevated and lowered along a guide rail and including a first light emitter which performs irradiation of first light and a first photodetector which receives the first light;

a wire provided in parallel with an elevating and lowering direction of the elevating body and arranged at a position to block the first photodetector from receiving the first light between the first light emitter and the first photodetector;

a detector configured to detect that the elevating body is detached from the guide rail, a light emission controller configured to control the first light emitter, wherein the first photodetector receives the first light in response to the photoelectric sensor moving such that the wire deviates from the position, and the detector detects that the elevating body is detached from the guide rail when the first photodetector receives the first light, wherein when the light emission controller controls the first light emitter so as to stop the irradiation of the first light and the detector receives, from the first photodetector, a signal indicating that the first light is received, the detector detects that the first photodetector is in a short-circuit condition; and the photoelectric sensor further includes a second light emitter which performs irradiation of second light and a second photodetector which receives the second light, the position of the wire is a position to block the first photodetector from receiving the first light and not to block the second photodetector from receiving the second light, the first photodetector receives the first light and the second photodetector is blocked from receiving the second light by the wire in response to the photoelectric sensor moving such that the wire deviates from the position, and when the signal indicating that the first light is received is not received from the first photodetector and the second photodetector does not receive the second light, the detector detects that the first photodetector is in a disconnection condition.

2. The elevating body derailment detection device according to claim 1, wherein the photoelectric sensor further includes a third light emitter which performs irradiation of third light and a third photodetector which receives the third light, the position of the wire is a position to block the first photodetector from receiving the first light, not to block the second photodetector from receiving the second light and not to block the third photodetector from receiving the third light, the second light emitter, the second photodetector, the third light emitter and the third photodetector are arranged such that an optical path of the first light exists between an optical path of the second light and an optical path of the third light in a planar view, and when the signal indicating that the first light is received is not received from the first photodetector and the second photodetector does not receive the second light or the third photodetector does not receive the third light, the detector detects that the first photodetector is in the disconnection condition.

3. An elevating body derailment detection device comprising:

a photoelectric sensor provided on an elevating body elevated and lowered along a guide rail, including a first light emitter which performs irradiation of first light and a photodetector which receives the first light, and attached to a position where the first photodetector is blocked from receiving the first light by the guide rail; and a detector configured to detect that the elevating body is detached from the guide rail, wherein the first photodetector receives the first light in response to the first photoelectric sensor moving from the position, and the detector detects that the elevating body is detached from the guide rail when the photodetector receives the first light, wherein the photoelectric sensor further includes a second light emitter which performs irradiation of second light and a second photodetector which receives the second light, the position of the wire is a position to block the first photodetector from receiving the first light and not to block the second photodetector from receiving the second light, the first photodetector receives the first light and the second photodetector is blocked from receiving the second light by the wire in response to the photoelectric sensor moving such that the wire deviates from the position, and the photoelectric sensor further includes a third light emitter which performs irradiation of third light and a third photodetector which receives the third light, the position of the photoelectric sensor is a position where the first photodetector is blocked from receiving the first light by the guide rail, the second photodetector is blocked from receiving the second light by the guide rail, and the third photodetector is blocked from receiving the third light by the guide rail, the second light emitter, the second photodetector, the third light emitter and the third photodetector are arranged such that an optical path of the first light exists between an optical path of the second light and an optical path of the third light in a planar view, and when the signal indicating that the first light is received is not received from the first photodetector, the second photodetector receives the second light and the third photodetector receives the third light, the detector detects that the first photodetector is in the disconnection condition.

* * * * *